Dec. 20, 1932.         C. H. GUNN         1,891,261

SAFETY WING FOR AIRPLANES

Filed Oct. 5, 1931

INVENTOR
Chas. H. Gunn
BY
ATTORNEY

Patented Dec. 20, 1932

1,891,261

UNITED STATES PATENT OFFICE

CHARLES H. GUNN, OF BURLINGAME, CALIFORNIA

SAFETY WING FOR AIRPLANES

Application filed October 5, 1931. Serial No. 566,986.

This invention relates to airplanes and particularly to an auxiliary normally inactive wing such as is shown in my Patent No. 1,755,540, dated April 22, 1930, over the structure of which the present invention is an improvement.

The previous patent contemplated a rigid auxiliary wing mounted on top of the main wing and a means for moving the auxiliary wing forwardly while causing it to assume an upward angle so as to properly catch the air and aid in supporting or stabilizing the airplane. This arrangement not only had a bulky appearance and necessitated a somewhat complicated mechanism for mounting and operating the auxiliary wing, but the air stream exerted a constant tendency to lift the auxiliary wing from its normally folded position due to the location of the same on the main wing.

The principal object of the present invention therefore is to avoid the above objectionable features by so positioning and mounting the auxiliary wing that its presence is not normally noticed, its control and mounting mechanisms are much simpler and there is no tendency for the auxiliary wing to be moved from its normal retracted position by the force of the air stream.
A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
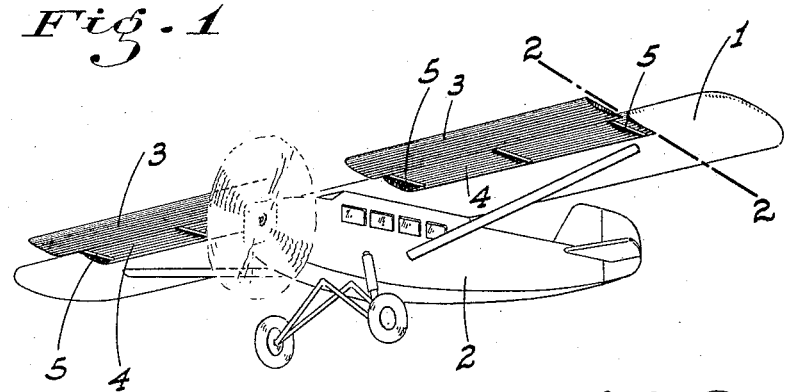
Fig. 1 is a perspective view of an airplane of the monoplane type in flight showing the auxiliary wings extended.

Referring now more particularly to the characters of reference on the drawing, the numeral 1 denotes the wing of a monoplane which in an airplane of this type is usually divided into two laterally separated sections by the fuselage 2, the top of which at the front is approximately on a level with the top of the wing. This necessitates the employment of a pair of the auxiliary wings 3, one on each side of the fuselage as shown in Fig. 1.

Each auxiliary wing which extends from adjacent the outer edge of the main wing to adjacent the fuselage may be considered as being a segment of the under portion of the main wing at the front. When said auxiliary wing is retracted it fits into a pocket or depression 4 formed in the main wing so that when thus positioned the under side of the auxiliary wing is flush with the main wing and forms a portion of the contour or surface of the under side of the main wing. The top and bottom surfaces of the auxiliary wing have an upward slant relative to a horizontal plane so that when extended straight out said auxiliary wing tends to lift into the air and thus of course aids in lifting and sustaining the airplane.

The auxiliary wing is supported by a plurality of rigid arms 5 which are preferably of cylindrical tubular form for lightness and strength. These arms extend rearwardly from the upper surface of the auxiliary wing adjacent its rear end and are slidably supported in sleeves 6 rigidly mounted inside the main wing. These sleeves have longitudinal slots 7 in their upper surface through which ears 8 project, which ears are fixed on the arms. Attached to the ears of the different arms are cables 9 which extend lengthwise of and above the sleeves and about direction changing pulleys 10 fixed adjacent the ends of the slots. The cables of all the ears are then joined together and extend through the wing transversely of the airplane to a suitable operating means such as a drum 11 mounted in the pilot's compartment. The cables are wound on the drum in such a manner that the turning of the drum in one direction will move the arms out and a turning in the other direction will pull the arms in.

Figure 2:
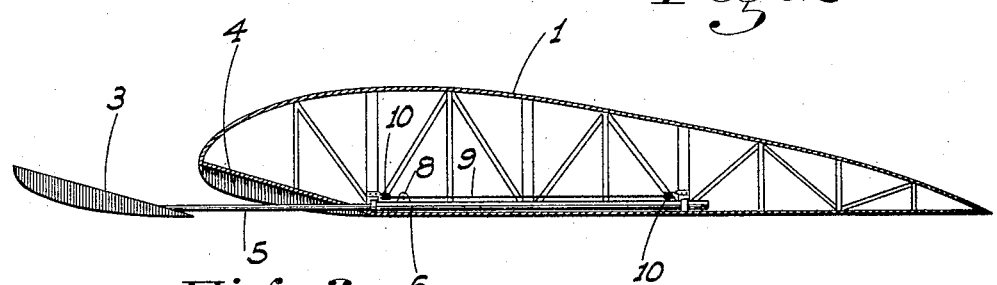
Fig. 2 is an enlarged sectional elevation of the main wing as on the line 2—2 of Fig. 1.
Figure 3:
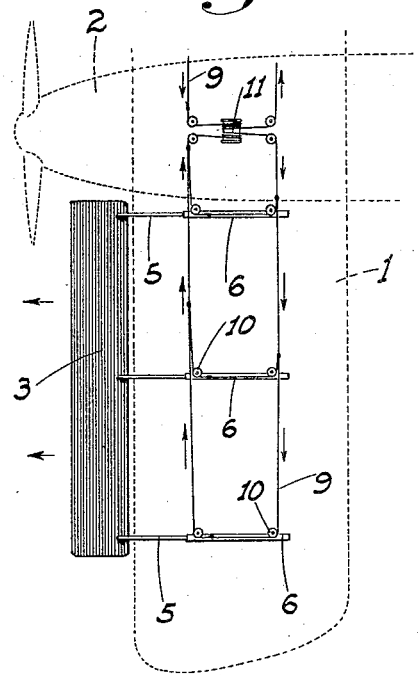
Fig. 3 is a fragmentary diagrammatic plan of the airplane showing the control means for the auxiliary wings.
Figure 4:
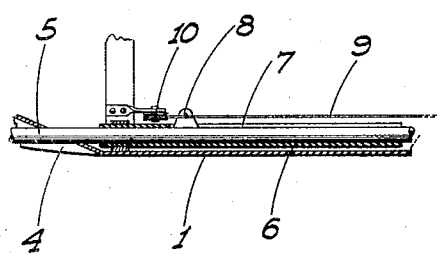
Fig. 4 is an enlarged fragmentary section of the supporting and control mechanism of the auxiliary wing.

The length of the slots and hence the possible movement of the arms is sufficient to enable the auxiliary wings to be moved from a fully retracted position to one in which their rear edges are substantially in the vertical plane of the forward edge of the main wing as shown in Fig. 2. It is of course to be understood that when two separate auxiliary wings are needed, as in a monoplane, the operating cables of the two wings are arranged so as to be moved simultaneously, in order to maintain the lateral equilibrium of the airplane. When mounting the structure on a biplane or on any type of plane in which the main wings are unobstructed from side to side, a continuous unbroken auxiliary wing may be used.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An auxiliary wing structure for airplanes comprising, with a main wing of the airplane having a recess in its under side extending rearwardly from its forward edge, an auxiliary wing normally fitting in said recess, arms rigid with and projecting rearwardly from the upper surface of the auxiliary wing and through the back wall of the recess into the main wing, members fixed in the main wing and slidably supporting the arms, and means applied to the arms within the wing to move the arms lengthwise in either direction selectively.

2. An auxiliary wing structure for airplanes comprising, with a main wing of the airplane having a recess in its under side extending rearwardly from its forward edge, an auxiliary wing normally fitting in said recess, arms rigid with and projecting rearwardly from the upper surface of the auxiliary wing and through the back wall of the recess into the main wing, sleeves fixed in the main wing and slidably supporting the arms, said sleeves having longitudinal slots, ears on the arms projecting through the slots, cables extending lengthwise of the slots and connected intermediate their ends to the ears, pulleys at the ends of the slots over which the cables pass to direct the same transversely of the airplane, said cables extending to the fuselage of said airplane, and means in the fuselage to control the movement of the cables to move the arms in either direction selectively.

In testimony whereof I affix my signature.

CHARLES H. GUNN.